(12) United States Patent
Polinske et al.

(10) Patent No.: US 12,520,090 B2
(45) Date of Patent: Jan. 6, 2026

(54) RELIABLE WIRELESS COMMUNICATIONS INCLUDING COMMANDS FROM AN APPLICATION THROUGH A SPEAKER TO A HEARING ASSISTANCE DEVICE

(71) Applicant: Eargo, Inc., San Jose, CA (US)

(72) Inventors: Beau Polinske, Minneapolis, MN (US);
Iain Butler, Pleasant Hill, CA (US);
Bryant Sorensen, Austin, TX (US)

(73) Assignee: Eargo, Inc., Mountain View, CA (US)

( * ) Notice: Subject to any disclaimer, the term of this patent is extended or adjusted under 35 U.S.C. 154(b) by 192 days.

(21) Appl. No.: 18/397,845

(22) PCT Filed: Jun. 30, 2022

(86) PCT No.: PCT/US2022/035695
§ 371 (c)(1),
(2) Date: Dec. 27, 2023

(87) PCT Pub. No.: WO2023/278681
PCT Pub. Date: Jan. 5, 2023

(65) Prior Publication Data
US 2025/0234142 A1    Jul. 17, 2025

Related U.S. Application Data

(60) Provisional application No. 63/217,114, filed on Jun. 30, 2021.

(51) Int. Cl.
*H04R 25/00* (2006.01)
*H02J 50/10* (2016.01)

(52) U.S. Cl.
CPC ............ *H04R 25/656* (2013.01); *H02J 50/10* (2016.02); *H04R 25/50* (2013.01); *H04R 25/554* (2013.01);
(Continued)

(58) Field of Classification Search
CPC .... H04R 25/656; H04R 25/558; H04R 25/65; H04R 25/654; H04R 25/658; H04R 2225/6025; H04R 2225/025; H04R 25/554
(Continued)

(56) References Cited

U.S. PATENT DOCUMENTS 9,819,705 B2    11/2017 Pedersen et al.
2013/0102251 A1    4/2013 Linde et al.

FOREIGN PATENT DOCUMENTS

EP    2983379 A2    2/2016
WO    WO-2012092973 A1 *    7/2012    ............... H04B 5/72

OTHER PUBLICATIONS

International Searching Authority, "The International Search Report and the Written Opinion on the International Searching Authority, or the Declaration" Sep. 30, 2022, 31 pages.

* cited by examiner

*Primary Examiner* — George C Monikang
(74) *Attorney, Agent, or Firm* — Rutan and Tucker, LLP

(57) ABSTRACT

An application sends the redundant instances of the data packet via an audio frequency speaker built into that external computing device to the microphone of the hearing assistance device. A microphone receives a wireless communication including a command that contains two or more redundant instances of a data packet, each instance contains a same command. Each redundant data packet is sent on its own carrier frequency in an audio frequency band. A configurable filter engine passes a signal corresponding to the same command transmitted by the audio frequency speaker built into that external computing device through one or more audio band band-pass filters. A control processor examines the band-passed signal and extracts information to extract the content payload of the data packet. A signal (Continued)

processor carries out an operation corresponding to the command from the content payload of the data packet in the hearing assistance device.

20 Claims, 7 Drawing Sheets

(52) U.S. Cl.
CPC .......... *H04R 25/558* (2013.01); *H04R 25/65* (2013.01); *H04R 25/654* (2013.01); *H04R 25/658* (2013.01); *H04R 2225/025* (2013.01); *H04R 2225/31* (2013.01)

(58) Field of Classification Search
USPC .............................. 381/312, 315, 77, 80–81
See application file for complete search history.

RELIABLE WIRELESS COMMUNICATIONS INCLUDING COMMANDS FROM AN APPLICATION THROUGH A SPEAKER TO A HEARING ASSISTANCE DEVICE

RELATED PATENT APPLICATIONS

This application claims priority to PCT patent application No. PCT/US22/35695, filed 30 Jun. 2022, entitled "Reliable Wireless Communications Including Commands from an Application through a Speaker to a Hearing Assistant Device," which claims priority under 35 USC 119 to U.S. provisional patent application No. 63/217,114, filed 30 Jun. 2021, entitled "An Improved Hearing Assistance System" which the disclosure of such are incorporated herein by reference in its entirety.

NOTICE OF COPYRIGHT

A portion of the disclosure of this patent application contains material that is subject to copyright protection. The copyright owner has no objection to the facsimile reproduction by anyone of the software engine and its modules, as it appears in the United States Patent & Trademark Office's patent file or records, but otherwise reserves all copyright rights whatsoever.

FIELD

Embodiments of the design provided herein generally relate to hearing assistance systems and methods. For example, embodiments of the design provided herein can relate to hearing aids.

BACKGROUND

Hearing aids work best if the user wants to wear the hearing aid and can use the hearing aid comfortably. Also, a person's hearing loss is different with each person which can lead to a diverse command set to cover all possibilities of users using the hearing aid.

SUMMARY

Provided herein in some embodiments is a hearing assistance system such as a hearing aid.

In an embodiment, a microphone is configured to receive a wireless communication including multiple redundant instances of a data packet containing the same command; and thus, each instance of the data packet has a content payload containing, at least, the same command, where each redundant instance of the data packet is sent on its own sent on carrier frequency; and thus, multiple different carrier frequencies. Each different carrier frequency has a different center frequency. Each redundant instance of the data packet is generated from an application resident on an external computing device. The application is configured to have the external computing device send the wireless communication including the redundant instances of the data packet. Each redundant data packet is wirelessly transmitted on its own different carrier frequency via a speaker of that external computing device at an ultrasonic frequency to the microphone of the hearing assistance device. The microphone is configured to couple each different carrier frequency to a configurable filter engine in the hearing assistance device. The configurable filter engine is configured to pass a signal derived from the content payload containing, at least, the same command transmitted by the speaker built into that external computing device through one or more bandpass filters with an accumulative bandwidth set to pass all of the center frequencies of the corresponding different carrier frequencies. A signal processor is configured to carry out an operation corresponding to the command from the content payload of the data packet in the hearing assistance device.

In an embodiment, an application generates a wireless communication with multiple redundant instances of a data packet. Each redundant instance of the data packet has a content payload containing, at least, a same command. The application transmits each redundant instance of the data packet on its own carrier frequency; and thus, multiple different carrier frequencies. Each different carrier frequency has a different center frequency. Again each redundant instance of the data packet is generated from an application resident on an external computing device. The application is configured to have the external computing device send the wireless communication including the redundant instances of the data packet, each redundant data packet on its own different carrier frequency, via at least one of i) an ultrasonic frequency speaker of that external computing device at an ultrasonic frequency and ii) an audio frequency speaker built into that external computing device at an audio frequency to a microphone of a hearing assistance device. The microphone is configured to couple each different carrier frequency to a configurable filter engine in the hearing assistance device. The speaker transmits each redundant instance of the data packet on its own carrier frequency within a bandwidth of one or more bandpass filters set to pass all of the center frequencies of the corresponding different carrier frequencies. The content payload containing the same command transmitted by the speaker built into that external computing device through the one or more bandpass filters is configured to cause a signal processor in the hearing assistance device to carry out an operation in the hearing assistance device corresponding to the command.

These and other features of the design provided herein can be better understood with reference to the drawings, description, and claims, all of which form the disclosure of this patent application.

DRAWINGS

The drawings refer to some embodiments of the design provided herein as well as with the additional documents filed with this document which form this provisional patent application.

FIG. 1 illustrates a block diagram of an embodiment of an example hearing assistance device with a signal processing process.

FIG. 2 illustrates a diagram of an embodiment of an example application resident on the external computing device to send the reliable wireless communications, including the commands on the multiple different carrier frequencies, via the speaker of the external computing device at an ultrasonic frequency speaker as its wireless transmitter, to the microphone of the hearing assistance device, such as a hearing aid and/or ear bud.

Figure 6:
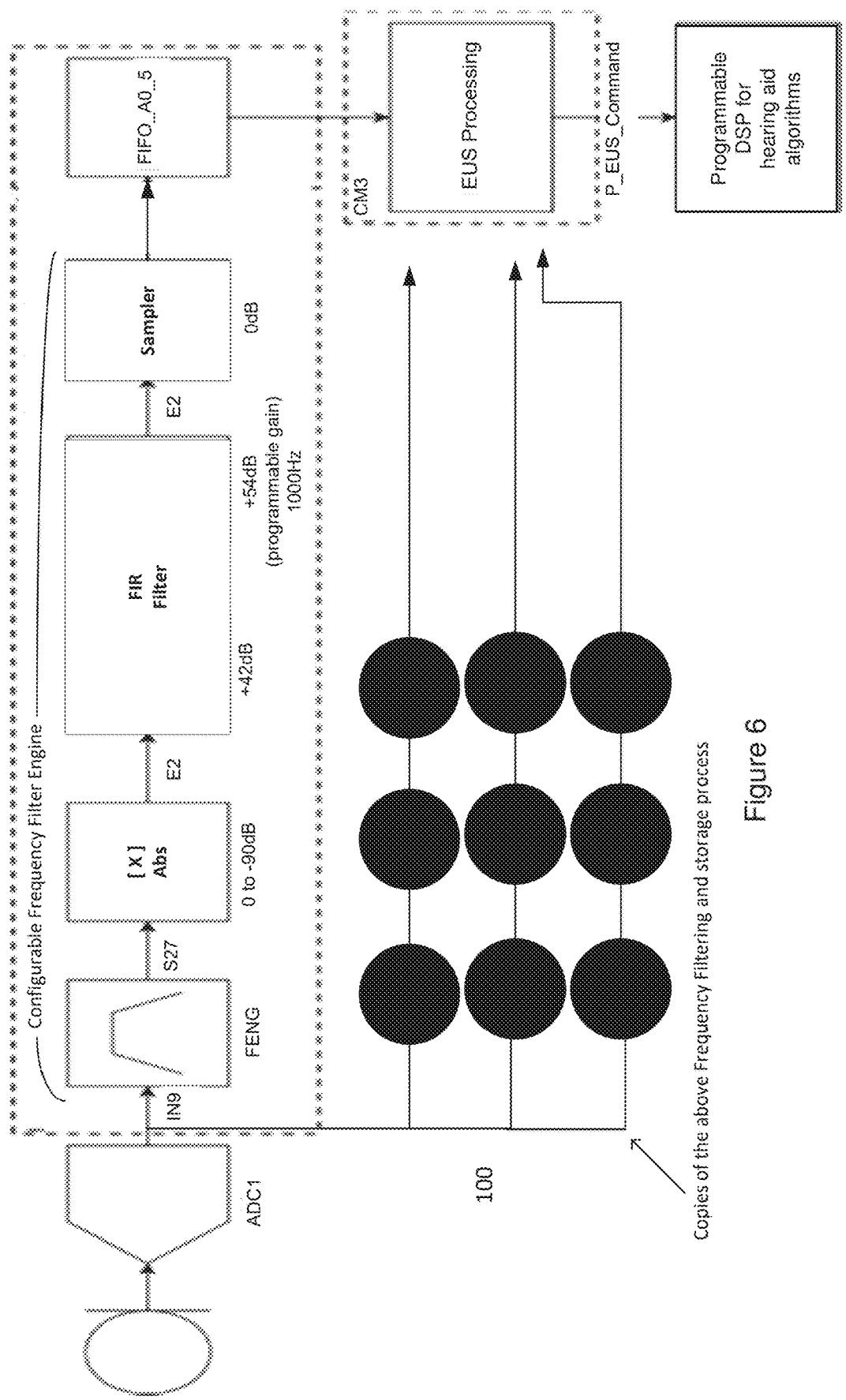

FIG. 6 illustrates a block diagram of an embodiment of an example orthogonal frequency-division multiplexing (OFDM) scheme using multiple copies of the frequency filtering and storage process in the hearing assistance device such that multiple bandpass filters are used and each of the multiple bandpass filters has a center frequency matched in value to a center frequency of the corresponding different carrier frequency.

Figure 7:
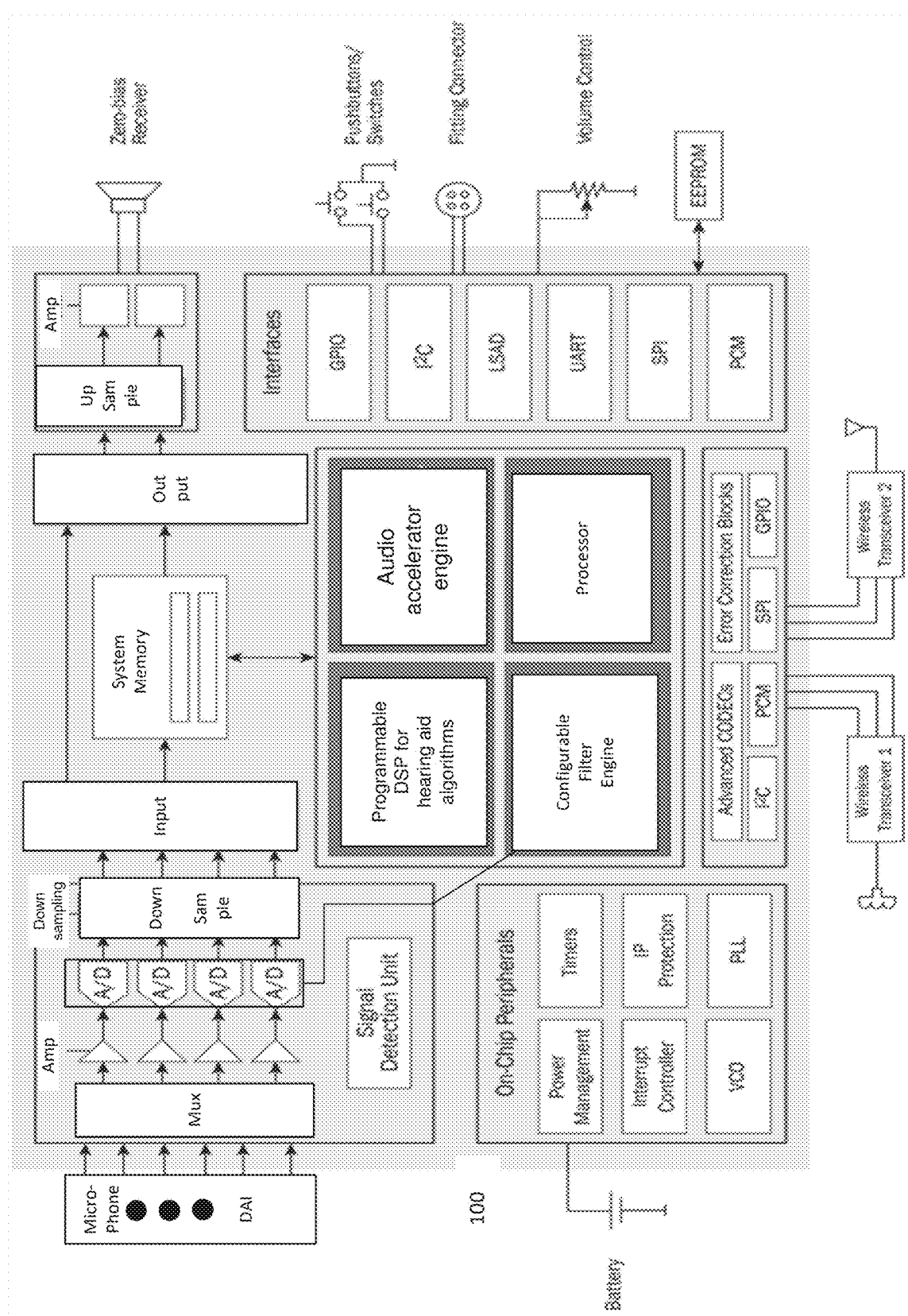

FIG. 7 illustrates a block diagram of an embodiment of an example computing system with a reliability checker configured to 1) perform a cyclic redundancy check to check that the content payload in the data packet has been successfully decoded; and thus, checked to ensure that the hearing assistance device is not at least one of i) reacting to false commands and ii) interpreting the commands improperly.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as first hearing aid can be made. However, the specific numeric reference should not be interpreted as a literal sequential order but rather interpreted that the first hearing aid is different than a second hearing aid. Thus, the specific details set forth are merely exemplary. The specific details can be varied from and still be contemplated to be within the spirit and scope of the present design. The term coupled is defined as meaning connected either directly to the component or indirectly to the component through another component.

Figure 1:
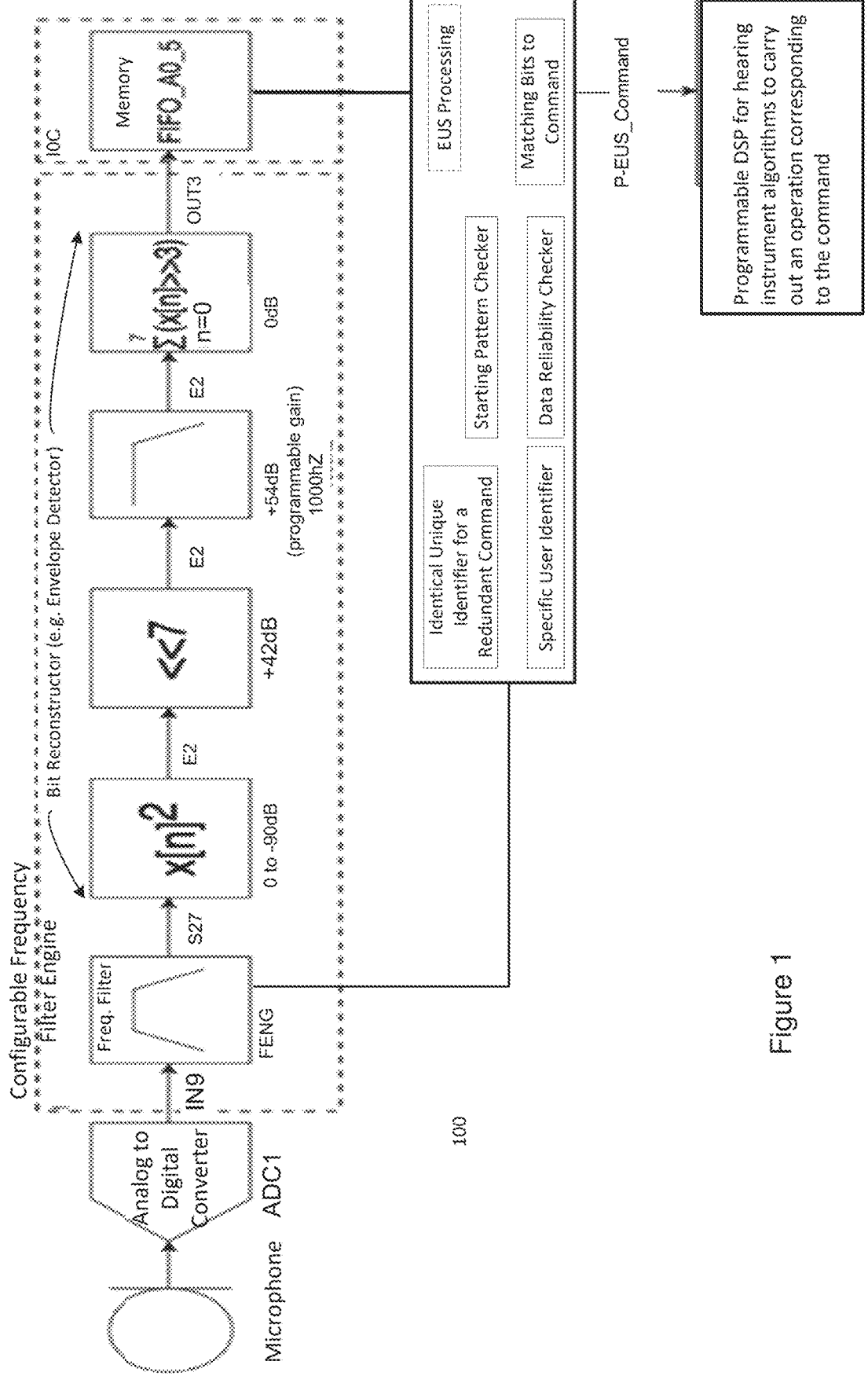

FIG. 1 illustrates a block diagram of an embodiment of an example hearing assistance device with a signal processing process. Some of the components in the signal processing process can be as follows.

A microphone receives a reliable wireless communication including a command that contains multiple (e.g., three or more) redundant instances of a data packet (e.g., use of different frequencies). Each instance of the data packet has a content payload containing, at least, a same command. Each redundant instance of the data packet is sent on its own sent on carrier frequency; and thus, multiple (e.g., three or more) different carrier frequencies. Each different carrier frequency has a different center frequency. Each redundant instance of the data packet is generated from an application 150 resident on an external computing device, such as a smart phone, notebook, smart watch, wireless charger, etc. The data packet contains the command, such as mute, volume up, volume down, go to different hearing modes, etc., from the user pressing the icon and/or button on the user interface of the application 150 on the external device. The application 150 can be configured to create a communication data packet which uses a pulse position modulation scheme, forward error correction, a cyclic redundancy check, and device addressing.

The transmitted signal in the three different frequencies from the speaker of external computing device may be received by the microphone of the hearing instrument and go through an analog to digital converter. The microphone transduces the audio frequency sound waves from the speaker into analog electrical audio signals and then digital electrical audio signals, which are then outputted from the microphone's output connection.

The microphone couples each different carrier frequency to a configurable filter engine in the hearing assistance device 100 via the analog to digital converter.

Analog to Digital Converter

The analog to digital converter receives the signal, from the microphone, corresponding to the wireless communication including the command. The analog-to-digital converter, abbreviated as "ADC" is constructed to convert analog (continuous, infinitely variable) signals to digital (discrete-time, discrete-amplitude) signals. In more practical terms, an ADC converts an analog input, such as a microphone collecting sound, into a digitized signal.

Note, the output of the analog to digital converter can bypass the digital down-sampling and be fed directly into the bandpass filter(s) of the configurable filtering engine. Again, the received signal from the ADC bypasses the down-sampling in order to retain its higher frequency and correspondingly a higher sampling rate that allows for more accuracy when detecting whether there's a logical one or zero in the content payload.

In an embodiment, data from the ADC at 128 kHz is sent to the input of the configurable filter engine (FENG).

Configurable Filter Engine

The configurable filter engine can be configured to have multiple audio bandpass frequency filters, and then perform bit reconstruction and decoding with the additional circuits of the Eargo UltraSonic (EUS) processing to determine the command/information being conveyed. The output of the EUS processing is then used by the programmable signal processor to perform command processing to implement that command inside one or both of the hearing assistance devices 100.

The configurable filter engine applies a series of operations.

In an embodiment, i) the decode of the content payload in the data packet can occur in parallel with ii) the operation to determine whether 1) an actual legitimate command is being picked up by the microphone or 2) the signal is environmental noise (within the same frequency as the anticipated frequency that the command will be transmitted at) errantly being interpreted as an unintended packet.

Frequency Filter

The configurable filter engine can receive the signal from the analog to digital converter. The configurable filter engine can pass a signal derived from the content payload containing (at least) the same command (along with the additional content in the data packet and a starting pattern before the data packet is transmitted) eventually to a processor through a memory.

The audio band or ultrasonic band speaker built into that external computing device transmits the wireless communication to one or more audio band bandpass filters and/or ultrasonic band bandpass filters in the hearing assistance device 100. The audio band bandpass filters and/or ultrasonic band bandpass filters are generally set with an accumulative bandwidth set to accommodate all of the center frequencies of the wireless communication.

The bandpass filter in the configurable filter engine can be set to have enough cumulative bandwidth, such as 13 kHz to 18.5 kHz, when cooperating with an external computing device using a speaker transmitting in the audio frequency range, in order to pass the multiple (e.g., three or more) different carrier frequencies. Each carrier frequency carrying its redundant content payload from the application 150. The configurable filter engine can implement one or multiple bandpass filters.

In an embodiment, multiple bandpass filters can be created in the configurable filter engine. Each of the multiple bandpass filters has a center frequency matched in value to the center frequency of the corresponding different carrier frequency. A bandpass filter can have bandwidth [e.g., a high frequency cutoff point stretching to a low of frequency cutoff point] and in the middle is a center frequency. Each bandpass filter will be centered on the frequency of the corresponding carrier and set narrow enough to filter out most other audio interference and/or ultrasonic interference. Note, when the transmitter/speaker on the external device has, for example, an ultrasonic transmission range, then the bandpass filter would be set to pass three frequencies in that ultrasonic frequency range.

In either embodiment of one or multiple bandpass filters being implemented in the hearing assistance device 100, the center frequencies can be as follows. In an example, the three frequencies broadcast could be each separated by 1.5 kHz, such as 13.5 kHz, 15 kHz, and 16.5 kHz, so they all experience the same time shift effect from transmission to reception. Thus, the carrier frequency range is set narrow enough so that the multiple carrier frequencies, each carrying its own redundant data packet, will all experience approximate a same time shift effect. The application 150 can transmit in multiple different frequencies (e.g., in a diversity of frequencies), for example, transmit in 13 kHz, 15 kHz, and 17 kHz; 13 kHz, 14 kHz, and 15 kHz; 13.5 kHz, 15 kHz, and 17 KHz, 15.5 kHz, 17 kHz, and 18.5 kHz, etc. In an embodiment, the wireless communication with the multiple redundant instances of a data packet, each containing a same command, is transmitted with all of the multiple (e.g., three) center frequencies at the same time. In the embodiment with three separate bandpass filters, then the first bandpass filter has, for example, a center frequency of 13 kHz, the second bandpass filter has, for example, a center frequency of 15 kHz, and the third bandpass filter has, for example, a center frequency of 17 kHz with an accumulative bandwidth of approximately 11.5 kHz to 18.5 kHz. The 13 kHz minus 1.5 kHz to 17 kHz plus 1.5 k Hz.

In an embodiment, the signal from the ADC can also be used to interrupt the configurable filter engine at 128 kHz. In an embodiment, the configurable filter engine can process the input with two or more biquad filters, doing a bandpass filter, for example, centered at 15 kHz and a wide enough bandwidth to pass the 13.5 kHz and 16.5 kHz carrier frequencies.

In an embodiment, the configurable filter engine can be configured to implement the one or multiple bandpass filters to have an overall bandwidth of 6 kHz, such as 13 kHz to 19 kHz when cooperating with the speaker built into that external computing device transmitting in the audio range, in order for the bandpass filters to pass the three different carrier frequencies from the external computing device. The overall bandwidth of the bandpass filter can be set narrow enough to filter out most other audio interference and/or ultrasonic interference.

Note, the wireless transmitter can be an audio frequency speaker and/or an ultrasonic frequency speaker that then cooperates with the configurable filter engine. The configurable filter engine is capable of changing the values of the programmable settings of the bandpass filter to receive the audio frequencies and/or the ultrasonic frequencies.

The configurable filter engine can implement efficient time-domain filters and can support an ultra-low delay audio path of 44 micro seconds (μs) for superior performance of features, such as occlusion management. The programmable filtering system allows applying a range of pre-processing filtering and post-processing filtering, such as Infinite Impulse Response (IIR) for low computational complexity and a lesser number of side lobes in the stop band than a Finite Impulse Response (FIR) filter with the same number of parameters.

Bit Reconstructor

The bit reconstructor (down-sampler/averaging module) can be configured to decode and perform bit reconstruction on the carrier frequency to determine the command/information being conveyed by the payload of the data packet sent by the application 150.

Next, the circuitry then applies a squared function on the signal. In an embodiment, the circuitry then applies a squared and/or an absolute value ($X[n]^2$) so that both sides of the wireless transmitted signal can be decoded and understood in order to improve the value of the bit reconstruction in the content payload. The squared function and/or an absolute value function applied can ensure that the wavelength signal being received is at least a threshold amount above the noise floor to ensure that the current audio signal being processed is not a spurious audio signal generated by the environment. (See FIG. 6 for an example signal process applying an absolute function.)

Again, the configurable filter engine can process received signals at a higher rate in order to do a greater amount of sampling at a finer level of detail in order to be more accurate when determining whether each value in the data payload is a logical one or a logical zero. Note, the signal can be squared during implementation to compensate for the non-linear nature of the square-law envelope detector and to ensure an intended command signal (e.g., something more than background noise is being processed).

In an embodiment, as discussed, an output of the biquad filters in the configurable filter engine can be stored in a register (s27) at a 128 kHz rate. The output of the bandpass filter (s27) is then multiplied by itself (squared) and the result is placed in extended-precision register (E3). After the circuitry applies a squared value (X[n]$^2$) so that both sides of the transmitted signal can be decoded and understood, then the circuitry applies a shift register (<<7) (e.g., a shift of 7 bits) to get the least significant values to assist in solving the square law and then shifting the value back to an expect range for the input into the subsequent low pass filter to create an acceptable slope of the signal with the low pass filter for decimating in the sampling averaging algorithm (ΣTN=0). Thus, the output of the squared function can be, for example, shifted left 3 bits. Next, the E2 register is moved to itself and shifted left 3 bits. The E2 register is then moved to itself again and shifted left 1 bit. Thus, a total of a 7 bit shift. (See FIG. 6 for a similar implementation with an absolute value block.)

The E2 register is then routed to a biquad for low pass filtering and output back to the E2 register. The E2 register is added to the contents of extended-precision register E3 and the results are placed in the E2 register at the input of the sampler module. The input of the sampler module is shifted right 3 bits, (which is effectively a divided by 8 function) to average the integration of 8 samples. The contents of the E3 register are moved to the memory (OUT3) (e.g., FIFO memory). Also, the contents of the E3 register can be subtracted from itself to clear the register and restart the integration of samples. Thus, the "sampler module" actually sums 8 samples at 128 kHz. Each sample is shifted right by 3 (divide by 8), and the output is sampled/cleared at 16 kHz.

As discussed, the application 150 can use forward error correction on the packets and a Gaussian bandpass filter to overcome hardware artifacts to transmit the redundant command. Next, the hearing assistance device 100 can further use CRC checks on the data packets, a start sequence check to ensure that this data packet is actually a packet being sent by the external device to be decoded and not external noise or acoustic interference from another device sending out packet information, and other checks to improve the reliability of this system.

Starting Pattern Checker for the Wireless Transmission Containing the Data Packet The configurable filter engine is configured to implement an audio band bandpass filter and the wireless transmission is configured to use a unique starting pattern before transmission of the data packet to help the reliability of the wireless transmission to eliminate environmental noise in the same frequency band, which could be errantly interrupted as a command to perform a corresponding operation in the hearing assistance device 100.

Thus, a start sequence checker is configured to ensure that the data packet is actually a data packet being sent by the external computing device to be decoded and not i) spurious external noise or ii) acoustic interference from another device sending out packet information being errantly interpreted as an unintentional command. The hearing assistance device 100 has the start sequence checker to check the multiple different carrier frequencies for the unique starting pattern.

Likewise, the application 150 is configured to add a starting pattern sequence with a strong/unique synchronization pattern at the start of the wireless communications in the audio band. The key is that the unique starting pattern uses a transmitted data pattern that matches an expected receiving data pattern. For example, the unique starting pattern can be bursts/cycling from an on state for x amount of micro seconds to an off state for the same x amount of micro seconds pattern (repeated several times in order to recognize a start of a legitimate command sequence for the hearing assistance device 100. The strong/unique synchronization pattern helps to ensure unintentional signals in the audio frequency band are not being interpreted as a start of a legitimate command sequence for the hearing assistance device 100 (e.g., hearing aid).

Likewise, the identifying/unique start sequence to increase robustness of the communication can be a pulse position modulation that allows variation in the position of the pulses according to the amplitude of the sampled modulating signal. A simple sequence of 9 milliseconds on followed by 9 milliseconds off that is repeated twice can be used.

Identical Unique Identifier (e.g., Sequence Number) for a Redundant Command

The application 150 is configured to i) encode and transmit the content payload containing, at least, the same command transmitted by the speaker built into the external computing device in, at least, three or more different audio frequency bands as the multiple different carrier frequencies, as well as ii) insert an identical unique identifier (e.g., sequence number) into each instance of the redundant data packet to limit the same command to be performed once per the multiple redundant instances of the data packet. Each data packet that has a same data payload has an identical unique identifier, such as a same sequence number, inserted into the packet. In an embodiment, each data packet that contains a redundant command has its own sequence number. Due to the sequence number of the data packet, if one of the three packets, one per center frequency, has been successfully decoded and checked for reliability and other checks, then the other two redundant data packets in the other transmitted frequencies do not need to be compared or examined beyond their sequence number. The other carrier frequencies with their identical unique identifier and redundant payload with the same command will be stopped from being processed and discarded when a first of the redundant packets is successfully decoded and passed its reliability checks. Thus, if/when the modules of the hearing assistance device 100 capture and decode the secondary or tertiary data packets sent at different frequencies, the configurable filter engine and EUS processing avoid acting/implementing the same command again because this system has an already verified a first data packet with the identical sequence number. However, if a first of the packets with an identical payload does not pass the reliability checks and it's discarded, then the second or the third identical/redundant packets, using different carrier frequencies, will continue to be checked and if tested to be reliable, then used. The use of an identical unique identifier for redundant packets is so that when the same command is sent in three or more different frequency bands, then that single command will not be interpreted as three separate requests to perform the specified command (such as increase volume) because that command is being received in three or more frequency bands at slightly different times. The same identical unique identifier in the redundant packet is used in the three or more different transmissions for that desired command so that the receiver in the hearing assistance device 100 can recognize the requested command all related a single request for that command.

Note, the three or more different audio frequencies has been statistically and practically found to ensure for both robustness in overcoming wireless transmission problems in the audio frequency range, in case, wireless packets get dropped in the wireless communications and are not properly received by the receiver in the hearing assistance device 100.

Specific User Identifier

Figure 4:
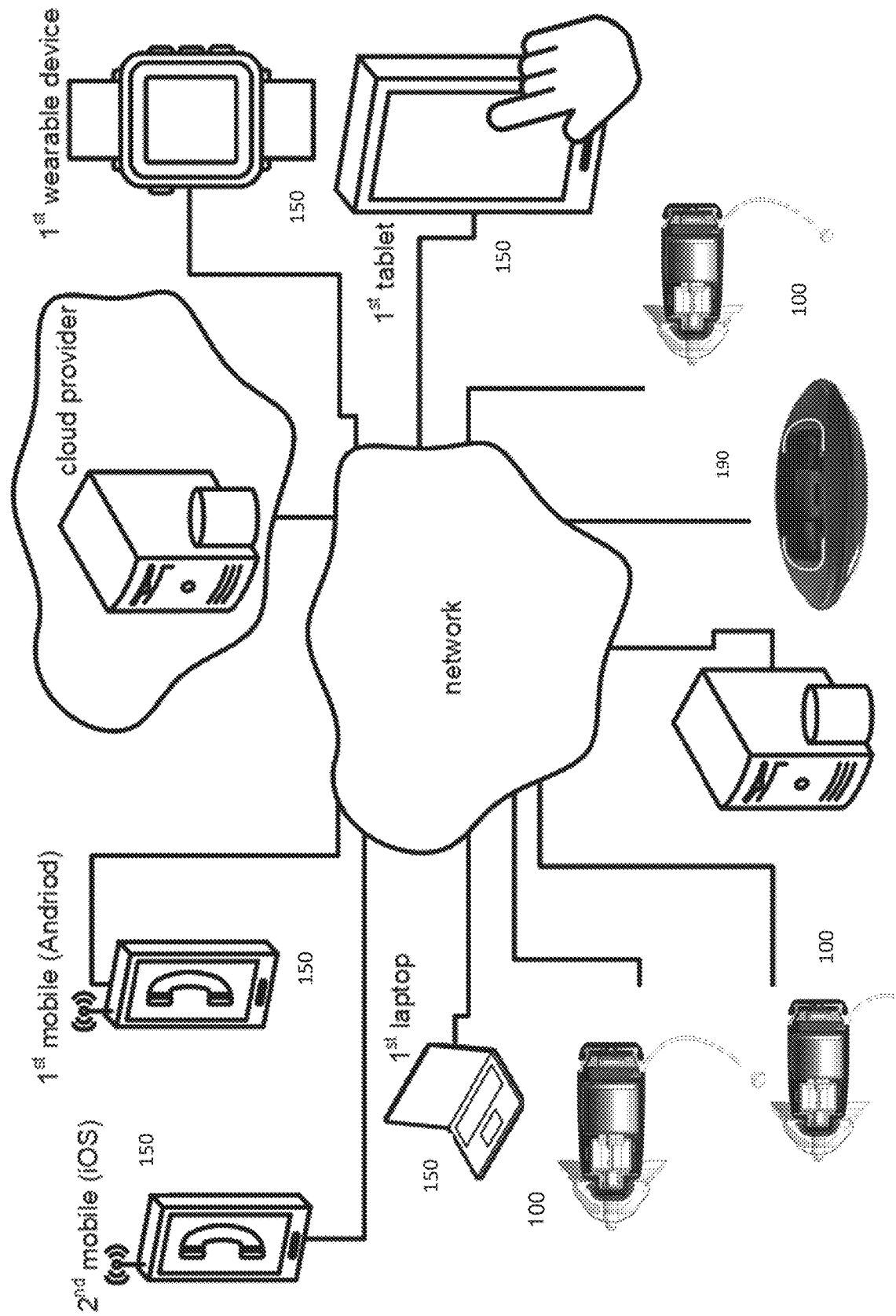
FIG. 4 illustrates a block diagram of an embodiment of an example network with multiple users each having their own set of hearing assistance devices and so the application inserts a specific user identifier into an address field of the data packet so each hearing assistance device merely reacts to commands from their particular user.

The application 150 can be configured to encode and transmit the redundant instances of the data packet that contain the same command and insert a specific user identifier into an address field of the data packet sent from the application 150 of the external computing device. The specific user identifier is tied to at least one of the user's hearing assistance device 100 and a user's account. (See FIG. 4) FIG. 4 illustrates a block diagram of an embodiment of an example network with multiple users each having their own set of hearing assistance devices 100. The application 150 inserts a specific user identifier into an address field of the data packet.

Again, the hearing assistance device 100 can be ear buds. The command sequence sent from the application 150 and speaker of the external computing device includes a specific address field that is tied to the user and their corresponding ear buds so that multiple users can each be in the similar area using their own external computing device and their own ear buds in their corresponding ears. Thus, a first user can send a command from their external computing device but only their paired earbuds with that application 150 resident on their external computing device will respond to that command even though the application 150 is sending out the audio signals in the same frequency bands that multiple different user's ear buds are expecting to receive and look for.

Data Reliability Checker

A reliability checker processor can be configured to perform at least both 1) a cyclic redundancy check configured to check that the content in the data packet has been successfully decoded; and thus, checked to ensure that the hearing assistance device 100 is not at least one of i) reacting to false commands and ii) interpreting the commands improperly and 2) send a signal to stop processing other redundant instances of the data packet with a same unique identifier when one of the redundant packets is successfully decoded and passed its reliability check.

Once the data payload has been verified as being accurate, then the decoded signal will be passed to the programmable digital signal processor in order to carry out an operation corresponding to the command on the hearing instrument.

Note, a cyclic redundancy check (CRC) is an error-detecting code used to detect accidental changes to raw data. In an embodiment, the CRC can have a seed value. The whole packet the checker divides by a seed number and the remainder is this CRC. The CRC could be applied across merely the unique starting pattern as well. The entire packet (e.g., size, address, payload including the command bytes and transmit data) multiplied or appended by the byte CRC can be run through the CRC calculation upon reception. In embodiment, any non-zero result indicates at least one bit is in error in the packet. In an embodiment, blocks of data entering hearing assistance device 100 can get a short check value attached, based on the remainder of a polynomial division of their contents. On retrieval, the calculation is repeated and, in the event the check values do not match, corrective action can be taken against data corruption. If the CRC values do not match, then the block contains a data error. The device may take corrective action, such as rereading the block or requesting that it be sent again.

If the CRC check is passed, the data is assumed to be error-free. The application 150 and hearing assistance device 100 can use a 4 bit CRC or 8 bit CRC, which decreases the probability of getting false data by a tremendous amount (e.g. $1/(2^{\wedge}4)$ probability vs. $1/(2^{\wedge}8)$)

The hearing assistance device 100 uses the reliability checker that uses a CRC check on the data packets to verify it has been successfully decoded and checked for reliability signal to improve user satisfaction with the external computing device and cooperating hearing assistant devices. The redundant packet with the same command will be sent to the hearing assistance device 100 in the three or more different frequencies, which will then perform the reliability checks on the received signal to ensure that the hearing assistance device 100 is not reacting to false commands, or interpreting the commands improperly, etc.

In an embodiment, a set of reliability checks will be performed by the reliability checker processor, a microprocessor working in parallel, such as an ARM Cortex M3 processor.

Matching Bits in the Content Payload of the Packet to a Command

In an embodiment, once the data payload has been verified as being accurate, then the EUS processor can match decoded bits in the content payload of the packet to a particular command.

Again, once the content payload has been verified by the reliability checker processor as being accurate, then the decoded signal and its bits will be passed to the programmable digital signal processor in order to carry out an operation corresponding the command on the hearing instrument (e.g., increase volume, decrease volume, mute, change mode, etc.).

An Operation Corresponding to the Command

A signal processor can be configured to carry out an operation corresponding to the command from the content payload of the data packet in the hearing assistance device 100. The programmable digital signal processor utilizes a set of hearing aid algorithms corresponding to the received command, which cause the electronics and software in the hearing assistance device to react to the command. For example, on volume up, the amplifier increases its gain to increase the amplification sound coming out of the hearing assistance device into the user's ear.

Figure 2:
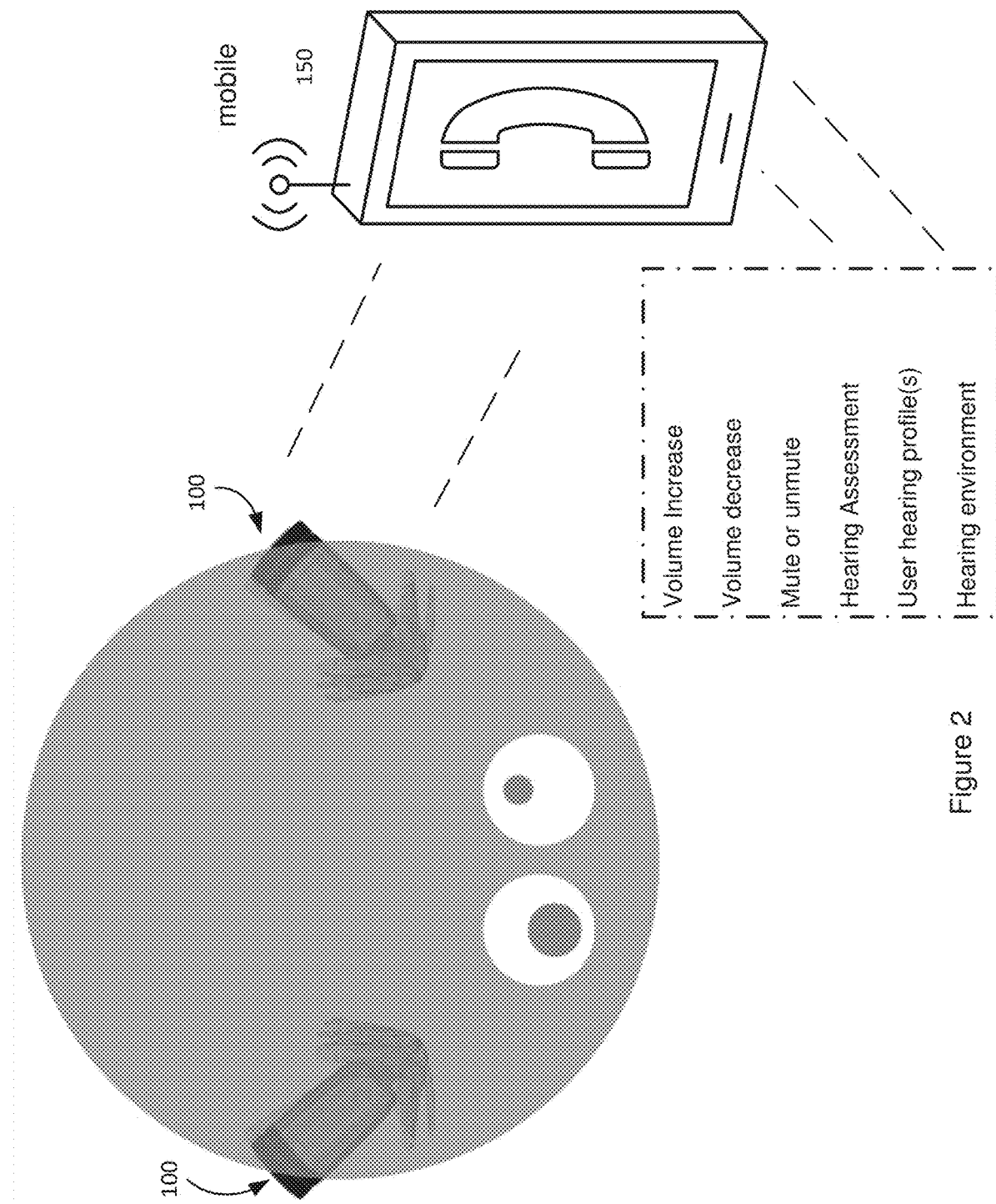

FIG. 2 illustrates a diagram of an embodiment of an example application resident on the external computing device to send the reliable wireless communications including the commands on the multiple different carrier frequencies via at least one of i) an ultrasonic frequency speaker and ii) an audio frequency speaker built into that external computing device as its wireless transmitter to the microphone of the hearing assistance device, such as a hearing aid and/or ear bud. The application 150 resident on the external computing device can use any of the ultrasonic frequency speaker and/or an audio frequency speaker built into the external computing device as its wireless transmitter to reliably send the command over to a hearing assistance device 100.

The application 150 resident on an external computing device, such as a smart phone, tablet, wireless charger, etc. sends out commands and communication with a hearing assistance device 100, such as a hearing aid and/or ear bud. Again, the application 150 can use a frequency diversity scheme of sending the redundant data packet load on three or more different frequencies, one frequency per packet, in order to overcome environmental effects of (phase shift, false positive audio signals from random audio frequencies signals in the environment) and increase the reliability of when a user presses a button to send a command from the external computing device to the hearing assistance device 100 that the command will be reliably sent and received by the hearing assistance device 100.

Note, the three or more different audio frequencies can be used to promote reliable delivery of the command, in case, 1) wireless packets get dropped in the wireless communications and/or 2) wireless packets are not properly received by the receiver in the hearing assistance device 100. Note, the application 150 can use a speaker to transmit wireless communications; and thus, eliminate a need to have components for a communications circuit and wireless transmitter specifically dedicated to other types of wireless circuits such as Wi Fi, Bluetooth etc., in order to transmit commands and/or data to the hearing assistance device 100. Note, the speaker built-in to the external computing device is an actual loud speaker with a dynamic range to generate audio frequencies throughout the audio frequency band (and/or ultrasonic frequency band in an embodiment) with fidelity, as opposed to, for example, a buzzer that emits an audio frequency beep in a very narrow range of frequencies.

The application 150 is configured to transmit the multiple different carrier frequencies with the built in speaker at three or more audio band frequencies. The application 150 transmits at the three or more different carrier frequencies with the same/redundant content payload in the multiple redundant instances of the data packets.

Each instance of the redundant or repeated data packet is transmitted at a different frequency. Different instances of a same command are transmitted at multiple different audio band frequencies (e.g., redundancy) to overcome a bad packet error rate including due to a poor transmission environment. For example, the application 150 sends multiple redundant commands at different frequencies because one data packet can be interfered with at a certain frequency, which is why the application 150 repeats the instances of the same command at a different frequency separated by at least 1 kHz, with the identical unique identifier (e.g., same sequence number).

The configurable filter engine in the hearing assistance device 100 can be configured to pass a signal derived from the content payload containing, at least, the same command to be decoded for the command, checked for errors, and ultimately to a signal processor in the hearing assistance device configured to carry out an operation corresponding to the command. Functions happening in the configurable filter engine could also happen on the ultrasonic (EUS) processor, and vice versa.

The application 150 is configured to transmit the multiple different carrier frequencies each with the redundant command with the built-in speaker to increase a robustness for each time when a user presses a button on the user interface of the application 150 to send the command from the external computing device to the hearing assistance device 100. The command in the content payload of the data packet directs the signal processor to perform the operation to the hearing assistance device 100.

The application 150 can be configured to apply a Gaussian filter to filter a baseband signal of each of the transmitted carrier frequencies in order to reduce harmonics or audio artifacts; this makes the audio signal being transmitted a lot quieter/less noticeable. The application 150 resident on the external computing device applies a Gaussian bandpass filter function prior to the wireless transmission through the speaker in order to decrease an amount of noise and/or buzz being generated in the audio frequency range when sending a command in packet form from the speaker of the host device.

When the user presses buttons on the user interface of the application 150 to have a selected/intended command happen, then the application 150 transmits in multiple different frequencies as well as causes different mechanisms to occur to check to see if the information received, in at least one of those multiple, different frequencies is really a command that the application 150 wants the hearing assistance device 100 to respond to.

The application 150 on the external computing device allows a greater amount and variety of commands than the limited set allowed by a mere touch based command set. The data packet can contain command type, additional qualifications and customizations, as well as an easy user interface to navigate to all of the commands available.

The application 150 can be configured to display a user interface on a display screen of the external computing device with a diverse set of commands that can be used to direct a change from one program command directly to another desired command in order to improve user satisfaction with the application 150 and cooperating hearing assistant devices. A benefit of wireless transmission of commands from an application 150 resident on an external computing device is that instead of a user touching their hearing assistance device 100 to cycle through potential commands to enact/carryout, the user can use the display of the external computing device as a smart phone, smart watch, etc. and use the user interface of the application 150 to directly activate the command they wish to initiate and then send that command. The application 150 automatically provides the redundancy without further user action. For example, if a hearing environment setting (e.g., a restaurant setting) for hearing mode is the fourth mode of operation and the user's hearing assistance device 100 is currently in the first mode of operation—default hearing environment setting mode—then the wireless command communicated over the frequency diversity in the audio band will be to direct the hearing aid to go directly to that fourth mode of operation without having to cycle through the second mode, and the third mode of environment setting in order to get to the fourth hearing mode of operation. Also, the user interface allows the user to direct a change from a volume change directly to hearing environment change without having to cycle through the commands between commands in between these. Thus, the application 150 can direct a change from one program command directly to another command. Likewise, the user can directly change from a volume up/down command over to calibration and/or update command on the graphic user interface versus needing to cycle through many modes and different types of commands (e.g., intermediate steps) in order to get to the settings command.

The hearing assistance device 100 has a signal processor configured to execute a hearing instrument algorithm to carry out a single operation corresponding to the redundant command on the hearing assistant device. Additionally, the command can be sent in multiple audio frequency ranges and eliminate random false positives on the receiver side of those audio frequency commands via use of a redundant checker and other checks in the EUS process.

The data packet can have an address field, a sequence field, a side field, a command field, and other fields.

The address field can be used to indicate an address, (e.g., specific identification sequence), for the hearing assistance device 100 for that user.

The sequence field can be used to indicate the unique identifier (e.g., sequence number) of the message. The sequence field is used to indicate a new message or a repeated message. A message is considered a repeat if the sequence value remains the same for consecutive messages. A message is considered new if the sequence value is different compared to the sequence in the message sent just previously. Repeated messages are used to increase the rate of success of the message being sent as wireless transmission to be received and decoded by the hearing assistance device 100.

The side field can used to indicate which hearing assistance device 100 the message is intended for. The side field is used to encode Left ('L') and Right ('R'). 'L' is used to indicate the left hearing assistance device, 'R' is used to indicate the right hearing assistance device. If both L and R are set, the message is for both the left and right hearing assistance devices 100.

The command field can be used to specify a command. Example supported commands can be as follows.

Volume Increase (e.g., 1 dB and up to 4 dB at a time); Volume decrease (e.g., 1 dB and up to 4 dB at a time); Volume (Mute or unmute); Hearing Assessment (Start/Stop Signal); User Hearing Profile(s) baseline; Hearing Environment, Turn On or Off, etc.

The user preferred command can be used to set the user preferred profile. User hearing profiles 1-8 for different hearing loss compensation for this user for different hearing environment scenarios.

The hearing environment can change the user's base line hearing loss profile to be improved for the hearing environment such as Restaurant; Phone; Crowd; TV; Meeting; Theater; Listening to Music; etc.

Figure 3:
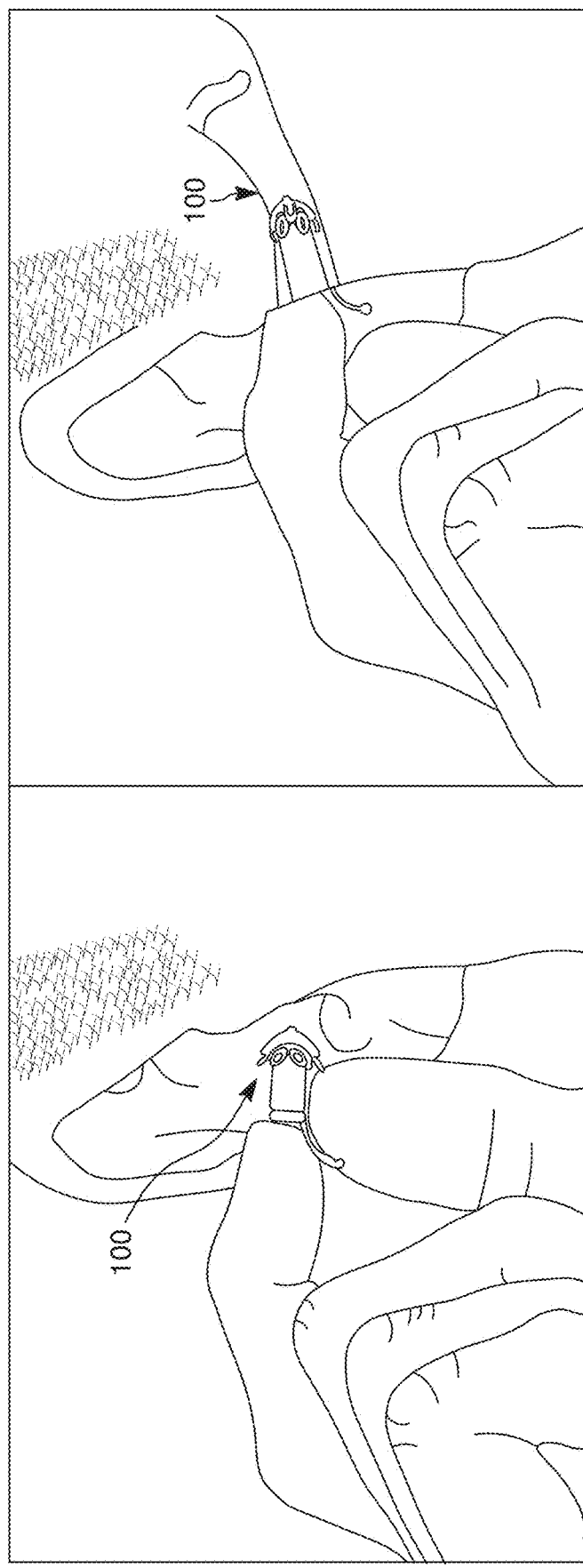
FIG. 3 illustrates a diagram of an embodiment of an example hearing assistance device configured to have dimensions which allow the hearing assistance device to fit and be implemented as an in-the-ear-canal hearing aid and/or an ear bud.

FIG. 3 illustrates a block diagram of an embodiment of an example hearing assistance device configured to have dimensions which allow the hearing assistance device to fit and be implemented as an in-the-ear-canal hearing aid and/or an ear bud.

The application 150 can use the audio frequency speaker built into the external computing device as its wireless transmitter so that the hearing assistance device 100 does not need to have a Wi-Fi circuit and antenna; and thus, the hearing assistance device 100 is configured to have dimensions which allow the hearing assistance device 100 to fit and be implemented as at least one of i) an in-the-ear-canal hearing aid and ii) an ear bud rather than a behind-the-ear hearing aid or a headset. The hearing instrument can be a completely in-the-ear-canal hearing aid and/or an ear bud because these commands are being transmitted in the audio frequency range, which can be received in-the-ear-canal (as other audio frequency signals are in the normal hearing range of a user); and thus, does not need an antenna for a frequency outside of the ear in order to be able to receive the command coming from the speaker and application. This hearing assistance device 100 can be a relatively invisible device in-the-ear canal hearing aid, which is configured to overcome ear anatomy and multiple paths of sound that can be sensed in the ear. The software and frequency diversity scheme allow a reliable wireless communication of commands to the hearing assistance devices 100 without additional hardware in the external computing device and/or in the hearing assistance devices 100, which also allows the form factor/size of the device to stay small and simple so the devices can fit in-the-ear-canal. The software approach allows less computing cycles, less memory, and less battery power consumption for the hearing assistance device 100, compared to radio frequency wireless communication; and thus, longer life for the hearing assistance device 100.

Note, additional wireless environmental issues exist for an in-the-ear-canal hearing aid and/or an ear bud because these commands are being transmitted in the audio frequency range. There are multiple pathways for audio signals to enter and penetrate into human ears. For the environment, the actual room that's around a user acts as a multicast source for audio signals to enter and penetrate into human ears.

The external computing device can be a smart phone, notebook, smart watch, etc. and eliminate both 1) a separate need for a dedicated wireless remote, that would be hard to update its applications and user interface, as well as 2) the use of a wireless remote device that would be more noticeable in public or in a social gathering when sending a new command to the hearing assistance device 100 installed in their ear. The reliability system of the hearing assistance device 100 does not require the implementation of additional hardware, such as a wireless communication circuit to receive and decode frequencies in the Wi-Fi and/or Bluetooth frequency spectrums. This allows the hearing assistance device 100 to maintain a small form factor as an in-the-ear canal hearing assistance device 100.

Figure 5:
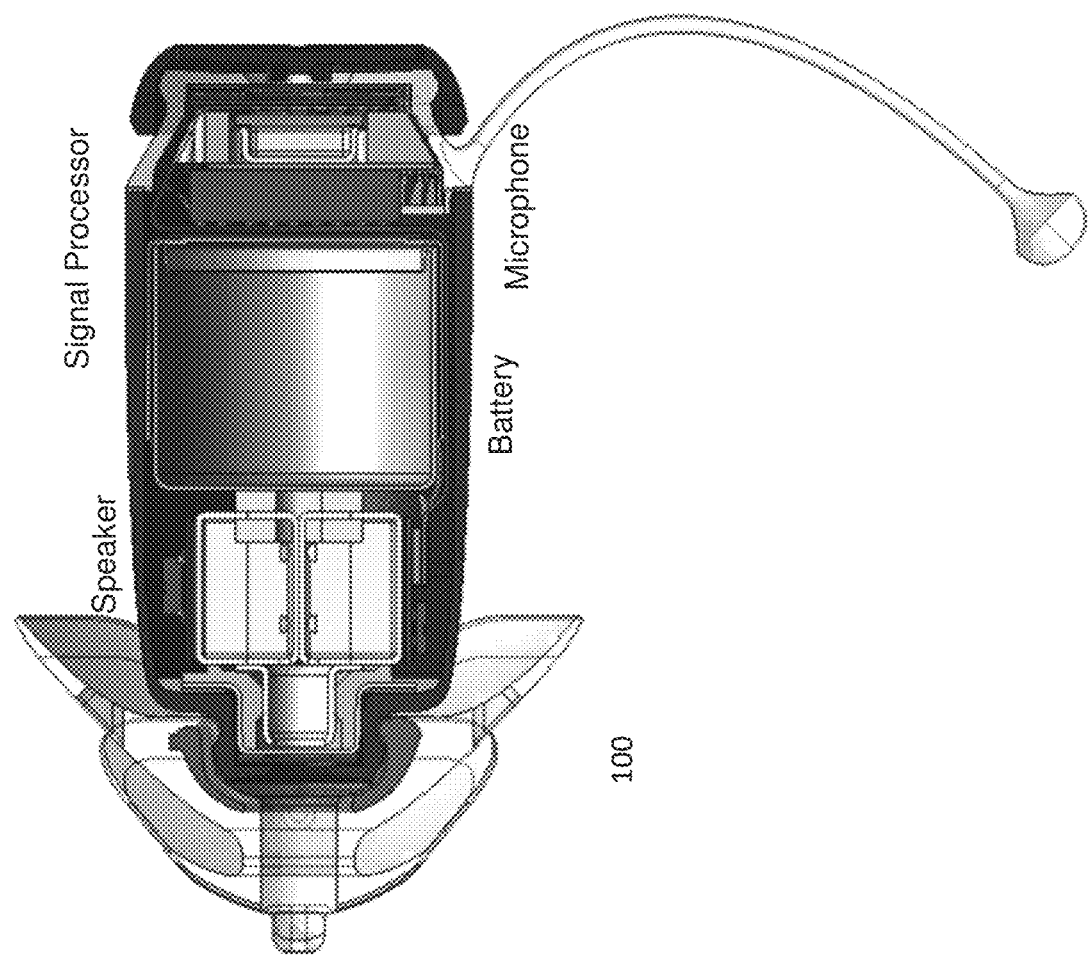
FIG. 5 illustrates a front on view as well as a side diagram of an embodiment of an example hearing assistance device implemented as a hearing aid with a microphone, a configurable filter engine, and a signal processor configured to carry out an operation corresponding to the command from the content payload of the data packet in the hearing assistance device.
Figure 5:
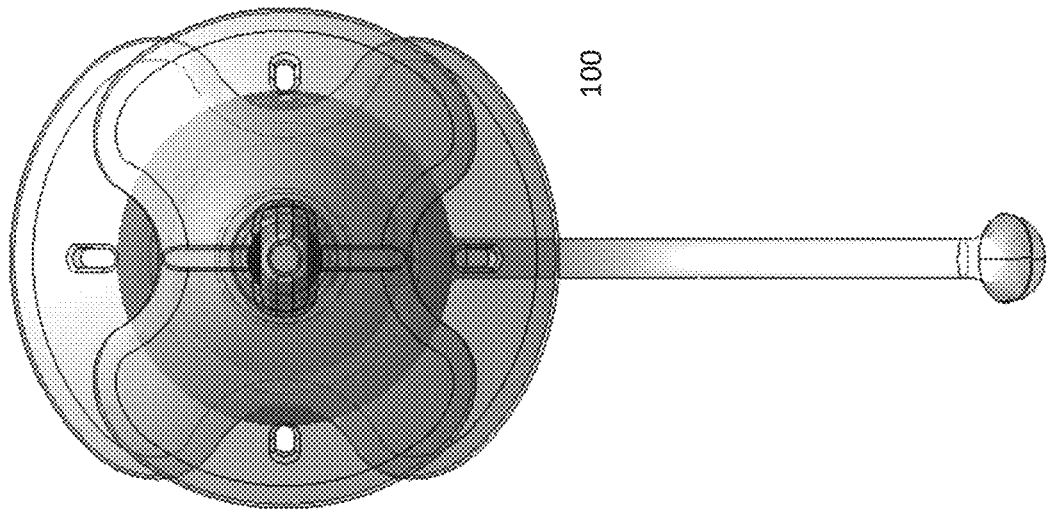

FIG. 5 illustrates a front on view as well as a side diagram of an embodiment of an example hearing assistance device 100 implemented as a hearing aid with a microphone, a configurable filter engine, and a signal processor configured to carry out an operation corresponding to the command from the content payload of the data packet in the hearing assistance device 100.

FIG. 4 illustrates a block diagram of an embodiment of an example network with multiple users each having their own set of hearing assistance devices and so the application inserts a specific user identifier into an address field of the data packet so each hearing assistance device merely reacts to commands from their particular user.

The application 150 can be configured to encode and transmit the signal in an audio band with the commands in at least three or more different audio frequency bands and insert a specific user identifier (e.g., command sequence) into the data payload sent from the application 150 of the external computing device includes a specific address field that is tied to the user's hearing assistance device 100 and/or user's account. The command sequence sent from the application 150 and wireless communication circuit of the host computing device includes a specific address field that is tied to the user and their corresponding ear buds so that multiple users can each be in the similar area using their own host computing device and their own ear buds in their corresponding ears, and a first user can send a command from their host computing device but only their paired earbuds with that app resident on their host computing device will respond to that command even though the application 150 is sending out the audio signals in the same frequency bands with the same CRC checks, and same starting pattern that all of the earbuds are configured to receive and look for.

A specific user identifier (e.g., command sequence) is inserted by the application 150 into a specific address field of the data packet. The data packet with the specific user identifier sent from the application 150 of the external computing device is tied to the user's hearing assistance device 100 and/or user's account. The command sequence sent from the application 150 and wireless communication circuit of the external computing device includes a specific address field that is tied to the user and their corresponding ear buds so that multiple users can each be in the similar area using their own external computing device and their own ear buds in their corresponding ears, and a first user can send a command from their external computing device but only their paired earbuds with that app resident on their external computing device will respond to that command even though the application 150 is sending out the audio signals in the same frequency bands with the same CRC checks, and same starting pattern that all of the earbuds are configured to receive and look for.

FIG. 6 illustrates a block diagram of an embodiment of an example orthogonal frequency-division multiplexing (OFDM) scheme using multiple copies of the frequency filtering and storage process in the hearing assistance device such that multiple bandpass filters are used and each of the multiple bandpass filters has a center frequency matched in value to a center frequency of the corresponding different carrier frequency.

Each copy of the frequency filtering and storage process in the hearing assistance device 100 can have a configurable filter engine with its own bandpass filter, a module that applies an absolute value function, a Finite Impulse Response (FIR) filter, a sampler, and a memory. The output of the frequency filtering and storage process is supplied as an input to the EUS process. The application 150 can be configured to use the orthogonal frequency-division multiplexing (OFDM) scheme to send the multiple redundant instances of a data packet that contain the same command in, for example, the OFDM scheme transmits four different pulse position modulation signals with redundant data packets. Two to four orthogonal symbols can be sent at once.

The ADC receives the four different pulse position modulation signals and feeds these to four identical parallel signal flow processing chains. Each parallel signal flow processing chain has a slightly different band pass frequency than the other signal flow processing chains. Each chain of the four parallel paths will have its own bandpass filter at slightly different frequencies from each other. For example, the four different center frequencies can be 14 kHz, 15.5 kHz, 17 kHz, and 18.5 kHz. The signal out of the bandpass filter is passed to an absolute value module, where the linear signal can be detected. Next, an output of the absolute value module is passed to a FIR low pass filter, and then sample every, for example 8th sample, which would reduce the time to process the transmitted command. In this embodiment, the absolute value module starts the process followed by a FIR filter that decimates, instead of averaging, every eight samples. The output of the sampler is then output to a first in first out buffer (FIFO) in the input output memory. The output of the memory is then supplied to the additional reliability processing logic (e.g., EUS Processing) in the EUS processor, such as a micro-processor such as an ARM Cortex M3 processor.

FIG. 7 illustrates a block diagram of an embodiment of an example computing system with a reliability checker configured to perform a cyclic redundancy check to check that the content payload in the data packet has been successfully decoded; and thus, checked to ensure that the hearing assistance device is not at least one of i) reacting to false commands and ii) interpreting the commands improperly.

In an embodiment, the hearing assistance device 100 may use an Ezairo 7100 series DSP System-on-Chip (SoC), such as a 7120.

The control processor in the hearing assistance device 100, such as an ARM® Cortex™-M3 processor, supports many different wireless protocols (e.g., NIMI, RF, Wi-Fi, etc.) and complements the digital signal processor with special error-correction and audio coding support. The processor supports efficient data transfer to and from a wireless transceiver. The subsystem can include hardwired CODECS (e.g., G.722, CVSD) and Error Correction Code support (e.g., Reed-Solomon, Hamming, etc.)

The programmable DSP in the SoC may be a fully programmable 24-bit dual-MAC DSP core optimized to run advanced, computationally intensive hearing aid algorithms to carry out an operation corresponding to the command from the content payload of the data packet in the hearing assistance device 100.

Again, FIG. 4 illustrates a number of electronic systems, including the hearing assistance devices 100, communicating with each other in a network environment in accordance with some embodiments. The hearing assistance devices 100 as well as the wireless charger 190 can cooperate other components in those devices hosting the application 100 in the network. The communication network between the application 150 on a device, the wireless charger 190, and the hearing assistance devices 100 is shown. The application 150 on the device may collect and send information from the hearing assistance devices 100, via communications with the wireless charger 190, to a cloud platform and vice versa may receive information, via communications with the wireless charger 190, from the cloud platform. Any two of the number of electronic devices can be the computationally poor target system and the computationally rich primary system of the distributed speech-training system. The network environment has a communications network. The network can include one or more networks selected from a body area network ("BAN"), a wireless body area network ("WBAN"), a personal area network ("PAN"), a wireless personal area network ("WPAN"), an ultrasound network ("USN"), an optical network, a cellular network, the Internet, a Local Area Network (LAN), a Wide Area Network (WAN), a satellite network, a fiber network, a cable network, or a combination thereof. In some embodiments, the communications network is the BAN, WBAN, PAN, WPAN, or USN. As shown, there can be many server computing systems and many client computing systems connected to each other via the communications network. However, it should be appreciated that, for example, a single server computing system such the primary system can also be unilaterally or bilaterally connected to a single client computing system such as the target system in the distributed speech-training system. As such, FIG. 4 illustrates any combination of server computing systems and client computing systems connected to each other via the communications network.

The wireless interface of the target system can include hardware, software, or a combination thereof for communication via Bluetooth®, Bluetooth® low energy or Bluetooth® SMART, Zigbee, UWB or any other means of wireless communications such as optical, audio or ultrasound.

The communications network can connect one or more server computing systems selected from at least a first server computing system and a second server computing system to each other and to at least one or more client computing systems as well. The server computing systems and can respectively optionally include organized data structures such as databases. Each of the one or more server computing systems can have one or more virtual server computing systems, and multiple virtual server computing systems can be implemented by design. Each of the one or more server computing systems can have one or more firewalls to protect data integrity.

The at least one or more client computing systems can be selected from a first mobile computing device (e.g., smartphone with an Android-based operating system) with the application 100, a second mobile computing device (e.g., smartphone with an iOS-based operating system) with the application 100, a first wearable electronic device (e.g., a smartwatch) with the application 100, a first portable computer (e.g., laptop computer) with the application 100, a third mobile computing device or second portable computer (e.g., tablet with an Android- or iOS-based operating system) with the application 100, and digital hearing assistance devices 150, a wireless charger 190, and the like. Each of the one or more client computing systems can have one or more firewalls to protect data integrity.

Any one or more of the server computing systems can be a cloud provider. A cloud provider can install and operate application software in a cloud (e.g., the network such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources.

In some embodiments, software used to facilitate algorithms discussed herein can be embodied onto a non-transitory machine-readable medium. A machine-readable medium includes any mechanism that stores information in a form readable by a machine (e.g., a computer). For example, a non-transitory machine-readable medium can include read only memory (ROM); random access memory (RAM); magnetic disk storage media; optical storage media; flash memory devices; Digital Versatile Disc (DVD's), EPROMS, EEPROMs, FLASH memory, magnetic or optical cards, or any type of media suitable for storing electronic instructions.

Note, an application described herein includes but is not limited to software applications, mobile apps, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C++, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both. A module can be implemented by software that contain patterns of instructions stored in a memory and executed by one or more processors, electronic circuits, and any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures can be made from the foregoing design and embodiments without departing from the scope afforded by the following claims, which scope is only limited by the claims when appropriately construed.

What is claimed is:

1. A hearing assistance device, comprising:
a microphone configured to receive a wireless communication including multiple redundant instances of a data packet containing a same command; and thus, each instance of the data packet has a content payload containing, at least, the same command, where each redundant instance of the data packet is sent on its own sent on carrier frequency different than the carrier frequencies of the other redundant packets; and thus, multiple different carrier frequencies, each different carrier frequency has a different center frequency, where each redundant instance of the data packet is generated from an application resident on an external computing device, where the application is configured to have the external computing device send the wireless communication including the redundant instances of the data packet, where each redundant data packet is wirelessly transmitted on its own different carrier frequency via at least one of i) an ultrasonic frequency speaker and ii) an audio frequency speaker built into that external computing device to the microphone of the hearing assistance device, where the microphone is configured to couple each different carrier frequency to a configurable filter engine in the hearing assistance device,
where the configurable filter engine is configured to pass a signal derived from the content payload containing, at least, the same command transmitted by the speaker built into that external computing device through one or more bandpass filters with an accumulative bandwidth set to pass all of the center frequencies of the corresponding different carrier frequencies, and a signal processor configured to carry out an operation corresponding to the command from the content payload of the data packet in the hearing assistance device.

2. The hearing assistance device of claim 1, wherein the application is configured to transmit in two or more different carrier frequencies with the same command in the multiple redundant instances of the data packets, and where the configurable filter engine configured to pass the signal derived from the content payload containing at least the same command through multiple bandpass filters, and each of the multiple bandpass filters has a center frequency matched in value to a center frequency of the corresponding different carrier frequency.

3. The hearing assistance device of claim 1, wherein the application is configured to transmit the multiple different carrier frequencies with the built-in speaker as three or more audio band frequencies, and where the application is configured to apply a Gaussian filter to filter a baseband signal of each of the transmitted different carrier frequencies in order to control undesirable audio artifacts.

4. The hearing assistance device of claim 1, further comprising:

a reliability checker configured to 1) perform a cyclic redundancy check to check that the content payload in the data packet has been successfully decoded; and thus, checked to ensure that the hearing assistance device is not at least one of i) reacting to a false command and ii) interpreting the command improperly; as well as 2) send a signal to stop processing other redundant instances of the data packet with a same unique identifier when a first of the redundant packets is successfully decoded and passed its reliability check.

5. The hearing assistance device of claim 1, where the application is configured to i) encode and transmit the content payload containing, at least, the same command transmitted by the speaker built into the external computing device in at least two or more different audio frequency bands as the multiple different carrier frequencies, as well as ii) insert an identical unique identifier into each instance of the redundant data packet to limit the same command to be performed once per the multiple redundant instances of the data packet.

6. The hearing assistance device of claim 1, where the application is configured to display a user interface on a display screen of the external computing device with a diverse set of commands that can be used to direct a change from one program command directly to another desired command in order to improve user satisfaction with the application and cooperating hearing assistant device, and where the hearing assistance device has a signal processor configured to execute a hearing instrument algorithm to carry out an operation corresponding to the command on the hearing assistant device.

7. The hearing assistance device of claim 1, where the application is configured to use the audio frequency speaker built into the external computing device as its wireless transmitter so that the hearing assistance device does not need to have a Wi-Fi circuit and antenna; and thus, where the hearing assistance device is configured to have dimensions which allow the hearing assistance device to fit and be implemented as at least one of i) a completely in-the-ear-canal hearing aid and ii) an ear bud rather than a behind-the-ear hearing aid or a headset.

8. The hearing assistance device of claim 1, where the application is configured to use a unique starting pattern before a transmission of the data packet through the audio frequency speaker built into that external computing device to help a reliability of the wireless transmission to eliminate environmental noise in a same frequency band corresponding to one or more of the multiple different carrier frequencies, which then could be errantly interrupted as a command to perform a corresponding operation in the hearing assistance device, and the hearing assistance device has a starting pattern checker configured to check the multiple different carrier frequencies for the unique starting pattern.

9. The hearing assistance device of claim 1, where the application is configured to encode and transmit the redundant instances of the data packet that contain the same command in at least three or more different audio frequency bands and insert a specific user identifier into an address field of the data packet sent from the application of the external computing device, where the specific user identifier is tied to at least one of the user's hearing assistance device and a user's account.

10. A non-transitory machine-readable medium, which stores further instructions in an executable format by one or more processors to cause operations as follows, comprising:

generating a wireless communication having multiple redundant instances of a data packet, where each redundant instance of the data packet has a content payload containing, at least, a same command, transmitting each redundant instance of the data packet on its own carrier frequency; and thus, multiple different carrier frequencies, where each different carrier frequency has a different center frequency, where each redundant instance of the data packet is generated from an application resident on an external computing device, where the application is configured to have the external computing device send the wireless communication including the redundant instances of the data packet, each redundant data packet on its own different carrier frequency, via at least one of i) an ultrasonic frequency speaker and ii) an audio frequency speaker built into that external computing device as its wireless transmitter to a microphone of a hearing assistance device, where the microphone is configured to couple each different carrier frequency to a configurable filter engine in the hearing assistance device, and transmitting each redundant instance of the data packet on its own carrier frequency within a bandwidth of one or more bandpass filters set to pass all of the center frequencies of the corresponding different carrier frequencies, where the content payload containing the same command transmitted by the speaker built into that external computing device through the one or more bandpass filters is configured to cause a signal processor in the hearing assistance device to carry out an operation in the hearing assistance device corresponding to the command.

11. The non-transitory machine-readable medium of claim 10, which stores further instructions in the executable format by one or more processors to cause further operations as follows, comprising:

transmitting in three or more different carrier frequencies with the same command in the multiple redundant instances of the data packets, where each center frequency of the different carrier frequencies is matched in value to a center frequency of a corresponding bandpass filter.

12. The non-transitory machine-readable medium of claim 10, which stores further instructions in the executable format by one or more processors to cause further operations as follows, comprising:

transmitting the multiple different carrier frequencies with the built in speaker as two or more audio band frequencies, and applying a Gaussian filter to filter a baseband signal of each of the transmitted different carrier frequencies in order to control harmonics.

13. The non-transitory machine-readable medium of claim 10, which stores further instructions in the executable format by one or more processors to cause further operations as follows, comprising:

performing a cyclic redundancy check with a reliability checker to check that the content payload in the data packet has been successfully decoded; and thus, checked to ensure that the hearing assistance device is not at least one of i) reacting to a false command and ii) interpreting the command improperly; and sending a signal to stop processing other redundant instances of the data packet with a same unique identifier when a first of the redundant packets is successfully decoded and passed its reliability check.

14. The non-transitory machine-readable medium of claim 10, which stores further instructions in the executable format by one or more processors to cause further operations as follows, comprising:

i) encoding and transmitting the content payload containing, at least, the same command transmitted by the speaker built into the external computing device in at least two or more different audio frequency bands as the multiple different carrier frequencies, as well as ii) inserting an identical unique identifier into each instance of the redundant data packet to limit the same command to be performed once per the multiple redundant instances of the data packet.

15. The non-transitory machine-readable medium of claim 10, which stores further instructions in the executable format by one or more processors to cause further operations as follows, comprising:

displaying a user interface on a display screen of the external computing device with a diverse set of commands that can be used to direct a change from one program command directly to another desired command in order to improve user satisfaction with the application and cooperating hearing assistant device.

16. The non-transitory machine-readable medium of claim 10, which stores further instructions in the executable format by one or more processors to cause further operations as follows, comprising:

using the audio frequency speaker built into the external computing device as its wireless transmitter so that the hearing assistance device need not have a Wi-Fi circuit and antenna; and thus, where the hearing assistance device is configured to have dimensions which allow the hearing assistance device to fit and be implemented as at least one of i) a completely in-the-ear-canal hearing aid and ii) an ear bud; rather than, a behind-the-ear hearing aid or a headset.

17. The non-transitory machine-readable medium of claim 10, which stores further instructions in the executable format by one or more processors to cause further operations as follows, comprising:

using a unique starting pattern before the wireless transmission of the data packet through the audio frequency speaker built into that external computing device to help a reliability of the wireless transmission to eliminate environmental noise in a same frequency band corresponding to the multiple different carrier frequencies, which could be errantly interrupted as a command to perform a corresponding operation in the hearing assistance device.

18. The non-transitory machine-readable medium of claim 10, which stores further instructions in the executable format by one or more processors to cause further operations as follows, comprising:

encoding and transmitting the redundant instances of the data packet that contain the same command in at least three or more different audio frequency bands, and inserting a specific user identifier into an address field of the data packet sent from the application of the external computing device, where the specific user identifier is tied to at least one of the user's hearing assistance device and a user's account.

19. A hearing assistance device, comprising:

a microphone configured to receive a wireless communication including a command that contains two or more redundant instances of a data packet, where each instance of the data packet has a content payload containing, at least, a same command, where each redundant instance of the data packet is sent on its own carrier frequency in an audio frequency band; and thus, two or more different carrier frequencies, each different carrier frequency has a different center frequency in the audio frequency band, where each redundant instance of the data packet is generated from an application resident on an external computing device, where the application is configured to have the external computing device send the wireless communication including the redundant instance of the data packet, each redundant data packet on its own different carrier frequency via an audio frequency speaker built into that external computing device as its wireless transmitter to the microphone of the hearing assistance device, a configurable filter engine configured to pass a signal derived from the content payload containing, at least, the same command transmitted by the audio frequency speaker built into that external computing device through one or more audio band band-pass filters, and a signal processor configured to carry out an operation corresponding to the command from the content payload of the data packet in the hearing assistance device.

20. The hearing assistance device of claim 19, where the application is configured to use a unique starting pattern before the transmission of the data packet through the audio frequency speaker built into that external computing device to help a reliability of the wireless transmission to eliminate environmental noise in a same audio frequency band corresponding to one or more of the multiple different carrier frequencies, which could be errantly interrupted as a command to perform a corresponding operation in the hearing assistance device.

* * * * *